United States Patent Office 3,579,593
Patented May 18, 1971

3,579,593
PROCESS FOR PREPARING BETA-PHENYLETHYL ALCOHOL
Thomas F. Wood, Wayne, N.J., assignor to Givaudan Corporation, Clifton, N.J.
No Drawing. Filed Apr. 18, 1968, Ser. No. 722,224
Int. Cl. C07c 29/00
U.S. Cl. 260—618                      6 Claims

ABSTRACT OF THE DISCLOSURE

β-Phenylethyl alcohol suitable for perfumery use is prepared in excellent yields by the hydrogenation of styrene oxide in the presence of the two catalysts: Raney nickel and palladium, and fractionally distilling the alcohol.

SUMMARY OF THE INVENTION

This invention relates to a process for preparing β-phenylethyl alcohol of perfume grade, in excellent yields, by hydrogenating styrene oxide in the presence of two specific catalysts: Raney nickel and palladium. These catalysts do not give the desired results when employed by themselves; nor do mixtures of other catalysts.

BACKGROUND OF THE INVENTION

β-Phenylethyl alcohol is widely used in flavors and perfumery. It even has been said that, perhaps, no rose perfume is ever compounded without it.

As will be readily understood, therefore, efforts to devise practical, commercial, synthetic methods for its preparation have been numerous. One of such methods is the one disclosed in U.S. Pat. No. 2,524,096, by the present inventor, and involves the catalytic hydrogenation of styrene oxide in the presence of low temperature hydrogenation catalysts. While the method covered by U.S. Pat. 2,524,096 has attained considerable commercial success, it still has certain drawbacks. Considerable amounts of solvents are required for best yields, necessitating a time-consuming and expensive distillation step for removal of the solvents. Also, undesirable ethyl benzene, while obtained in lower amounts than was the case prior to the development of the method of U.S. Pat. 2,524,096, nevertheless, are still formed in substantial amounts. Ethyl benzene is undesirable because of its disagreeable odor and because its presence reduces the water solubility of β-phenylethyl alcohol to such an extent that the latter does not pass the standard test for perfume-grade acceptance. The test referred to is the requirement that 2 ml. of β-phenylethyl alcohol must be clearly soluble in 100 ml. of water.

Attempts have been made to improve the basic liquid phase process disclosed in U.S. Pat. 2,524,096, but without substantial success. For example, U.S. Pat. 2,822,403 suggests conducting the catalytic hydrogenation of styrene oxide in a water suspension and recommends the use of an emulifying or dispensing agent to achieve an intimate mixture of styrene oxide and water. The patent gives no actual weight yields but asserts in one example an "almost quantitative yield" and in the other example a "99% yield."

Aside from the fact that the present applicant has only been able to secure yields up to about 85%, the process of U.S. Pat. 2,822,403 has the disadvantages that it involves (1) a costly and time-consuming distillation to remove the large amounts of water; and (2) a costly solvent extraction or salting-out procedure necessitated by the presence of an emulsifying agent. Further, it has been found that large amounts of the undesirable ethyl benzene are formed in accordance with the process of U.S. Pat. 2,822,403.

DETAILED DESCRIPTION OF THE INVENTION

In general, the procedure of U.S. Pat. 2,524,096 may be followed in conducting the process of this invention. Thus, styrene oxide in the liquid phase is hydrogenated at comparatively low temperatures and superatmospheric pressure, in the presence of catalyst. The catalyst employed here is unique, however, being, as aforesaid a combination of nickel and palladium. Small amounts of polar solvents, inert under the reaction conditions, are also employed in the reaction mixture. Lower aliphatic alcohols having up to 5 carbon atoms, such as methanol, ethanol and isopropyl alcohol, are preferred. Also, as is known, small amounts of alkaline materials can be used to suppress isomerization of styrene oxide to phenylacetaldehyde.

The individual catalysts which form the components of the catalytic mixture used herein are well-known hydrogenation catalysts. They may be combined into a mixture of catalysts prior to use or may be separately charged into the reaction vessel.

The palladium may be used as such, and may, for example, be formed in situ. It is presently preferred, for practical and economic reasons, to use finely divided palladium deposited on an inert or active carrier, such as active carbon, kieselguhr, barium carbonate, barium sulfate, calcium carbonate, aluminum oxide, etc. The palladium content of such Pd-carrier combinations may vary. I have found that available mixtures having Pd contents of 1% and 5%, by weight, are satisfactory. I presently prefer to use palladium in the form of palladium on active carbon, the palladium content of the commercial products being 1 and 5%, by weight. If desired, the palladium on carbon catalyst may be specially prepared, for example, in accordance with the procedure set forth in Organic Synthesis, collective volume III, 385–6, 686–7.

Raney nickel catalyst is the presently-preferred form of nickel catalyst used in accordance with this invention.

The proportions of the nickel and palladium catalyst employed in accordance with the present process may vary over wide limits.

Amounts of nickel from about 1 to 10 parts, by weight, based on the 100 parts by weight of styrene oxide charged into the reaction vessel give satisfactory results. From about 3 to 6 parts by weight, on the same basis, are preferred.

As to the palladium catalyst, from about 0.0001 to 0.1 part, by weight of the metal, on the same basis, i.e., per 100 parts by weight of the styrene oxide used, can be employed, from about 0.003 to 0.006 part by weight being preferred.

The beneficial effects flowing from the use of nickel and palladium, jointly, as catalysts, were unexpected. Neither catalyst alone gives these effects, each one resulting in undesirable byproducts and appreciably lower yields of β-phenylethyl alcohol. For example, a yield of about 10% of ethyl benzene accompanies the use of nickel alone; whereas as much as 11% of phenylacetaldehyde is obtained when the catalyst used is palladium on carbon.

Nor do mixtures of other catalysts give the advantageous results obtained by the joint use of nickel and palladium catalysts.

For example, when copper chromite catalyst (commercial grade) is substituted for Raney nickel in the process of this invention, there is obtained under the best conditions an 85% yield of β-phenylethyl alcohol which is unacceptable to perfumers because of a by-odor similar to phenylacetaldehyde. Even after redistillation the product is not satisfactory for perfumery use. A mixture of ruthenium on carbon (5%) with palladium on carbon (5%) gives poor results. A mixture of Raney nickel and platinum on carbon (5%) in the hydrogenation process gives a crude product similar in all respects to that obtained with Raney nickel catalyst alone. This crude contains 10 to 11% of ethylbenzene and is thus not suitable for producing perfumery grade β-phenylethyl alcohol by direct distillation.

Another unexpected feature of the process of this invention is the excellent results secured even when very small amounts of solvents are used. Such amounts are as low as 5 to 20 percent by weight of the styrene oxide. Of course, if desired, much larger amounts may be used. The small, minor amounts of solvents used in the preferred form of this process permit the obtaining of perfumery-grade β-phenylethyl alcohol directly from the crude hydrogenation product by filtration, to remove catalysts, followed by vacuum distillation, there being no need to strip off solvents or to wash impurities out or to resort to any other purification technique.

In conducting the present process, it will be understood vy chemists that equimolecular amounts of hydrogen and styrene oxide are required to convert the latter to β-phenylethyl alcohol. An excess of hydrogen, e.g., 1.1 mols of the latter to 1 mol of styrene oxide is advantageous.

Nor are the temperature and pressure conditions, under which the reaction is conducted, critical. Temperatures within the range from about 10° C. to 140° C. are satisfactory, temperatures from about 30° C. to 110° C. being presently preferred. Pressures from about 50 to 500 pounds per square inch may be used, pressures from 50 to 200 p.s.i. being preferred.

Especially advantageous results are obtained when the reaction is conducted in two stages. The first stage involves the use of relatively low temperatures and pressures, e.g., temperatures from about 10° C. to 60° C., preferably 30° to 40° C., and pressures around 50 p.s.i. Then when hydrogen absorption substaintially ceases under the first stage conditions, the temperature and pressure are raised to enable the theoretical amount of hydrogen to be absorbed. The second stage temperatures may be from about 90° C. to 140° C., preferably about 90° C. to 110° C.; and the pressures during this stage may be around 200 p.s.i.

In order more fully to illustrate this invention, the following example is given. It is understood that this example is given for purposes of illustration and not for purposes of limitation.

All parts are by weight and all degrees are in degrees centigrade, unless otherwise specified.

EXAMPLE I (a) Two hundred and forty grams of pure styrene oxide was charged into the 500 ml. stainless steel bomb of an autoclave along with 28 g. of 85% methanol (aqueous), 2 g. of sodium bicarbonate, 10 g. of Raney nickel catalyst and 1 g. of palladium on carbon (1%) catalyst. The autoclave was evacuated and hydrogen was introduced up to a pressure of 50 p.s.i. The temperature was increased to 30° and agitation was begun. The temperature was allowed to rise to 40° and hydrogen was continued until absorption stopped (2 hrs.) and close to the theoretical amount of hydrogen had been absorbed.

The temperature was then increased to 100° and the pressure of hydrogen was raised to 200 p.s.i. and agitation was continued for 2 hrs. longer. The batch was cooled, removed from the autoclave, filtered, and distilled at 1 mm. Hg pressure.

There was obtained 232 g. of pure β-phenylethyl alcohol, B.P. 68–69° (1 mm.) $n_D^{20}$ 1.5332, free of ethylbenzene and suitable for perfumery use. This material was soluble to the extent of 2 ml. in 100 ml. of water producing a clear solution. The yield was 96.6% based on styrene oxide.

(b) When the above procedure of part (a) was repeated omitting the palladium catalyst, using instead 1 g. of active carbon, and the Raney nickel, the yield was only 212 g. of β-phenylethyl alcohol (88.3% yield) and the product was unacceptable for perfumery use because it contained traces of ethylbenzene and failed to pass both odor and water-solubility requirements. Vapor-phase chromatography showed that the original crude from the autoclave contained about 10% of ethylbenzene.

(c) When the hydrogenation was carried out as in (a) above except that both palladium metal catalyst and active carbon were omitted, only Raney nickel being used, the crude from the autoclave contained 10% of ethylbenzene and the yield of β-phenylethyl alcohol was 209 g. (87.0% yield). The product was unacceptable for perfumery use for the same reasons as in (b) above.

(d) When the hydrogenation was carried out as in (a) above except that 5% palladium on active carbon (1 g.) was substituted for the 1% palladium on active carbon, there was obtained 230 g. of pure β-phenylethyl alcohol (96% yield) suitable for perfumery use without further processing.

(e) When the hydrogenation was carried out as in (a) above except that 5% platinum on active carbon (1 g.) was substituted for the 1% palladium on active carbon, there was obtained a crude which contained 10.6% of ethylbenzene and gave 211 g. of distilled β-phenylethyl alcohol (88% yield). This was not suitable for perfumery use and failed both the odor and water-solubility tests because of the presence of a small amount of ethylbenzene.

(f) When the hydrogenation was carried out as in (a) above except that 50 mg. of "Palladium Black" (finely divided palladium metal without carrier) was substituted for the 1% palladium on active carbon, there was obtained 219 g. of pure distilled β-phenylethyl alcohol suitable for perfumery use without further processing.

EXAMPLE II (a) One hundred and twenty grams of pure styrene oxide was charged into the 500 ml. stainless steel bomb of an autoclave along with 160 g. of methanol, 5 g. of Raney nickel catalyst, and 0.5 g. of palladium on carbon (5%) catalyst. After evacuation of the autoclave hydrogen was introduced up to a pressure of 50 p.s.i. Hydrogenation was conducted at room temperature with agitation until the absorption stopped (2 hrs.) and close to the theoretical amount of hydrogen had been taken up. The temperature was then increased to 70° and the batch stirred under hydrogen at 50 p.s.i. for 3.5 hrs. The batch was cooled, removed from the autoclave, filtered, distilled for removal of methanol, and vaccum-distilled at 1 mm. Hg pressure. There was obtained 113 of pure β-phenylethyl alcohol (94.3%) free of ethylbenzene and suitable for perfumery use.

(b) When the hydrogenation of styrene oxide was carried out as in (a) above except that the recovered catalyst mixture from (a) was used, there was obtained 116 g. of pure β-phenylethyl alcohol (96.7%), free of ethylbenzene and suitable for perfumery use.

The foregoing illustrates the practice of this invention, which, however, is not to be limited thereby but is to be construed as broadly as permissible in view of the prior art and limited solely by the appended claims.

What is claimed is:

1. In a process for preparing beta-phenylethyl alcohol by the catalytic hydrogenation of styrene oxide, the improvement which comprises conducting the hydrogenation in the presence of Raney nickel and palladium catalysts, wherein the amount of Raney nickel employed is from about 1 to 10 parts, and the amount of palladium employed is from about 0.001 to 0.1 part based on 100 parts of styrene oxide, all of the parts being by weight, and the reaction is conducted at temperatures within the range from about 10° C. to 140° C. and under pressures of from about 50 to 500 pounds per square inch.

2. A process in accordance with claim 1, wherein the palladium is deposited on active carbon.

3. A process in accordance with claim 1, wherein the reaction is conducted in the presence of a minor amount of an inert, polar solvent.

4. A process in accordance with claim 1, wherein 240 grams of styrene oxide, 28 grams of aqueous methanol, 2 grams of sodium bicarbonate, 10 grams of Raney nickel and 1 gram of a 1 percent mixture of palladium on carbon are charged to an autoclave and hydrogen gas is introduced up to a pressure of 50 p.s.i., the temperature of the reaction contents being within the range from about 30° C. to 40° C. and when hydrogen absorption ceases increasing the temperature to 100° C. and the pressure of the hydrogen gas to 200 p.s.i. continuing the reaction until hydrogen absorption ceased again, filtering and removing perfumery-grade, β-phenylethyl alcohol by distilling the filtrate.

5. A process in accordance with claim 1, wherein the reaction is conducted in two stages, the first stage being conducted at temperatures within the range from about 10° C. to 60° C., under a pressure of about 50 p.s.i. until hydrogen absorption ceases, and the second stage being conducted at temperatures within the range from about 90° C. to 140° C., under pressure of about 200 p.s.i.

6. A process in accordance with claim 5, wherein an inert, polar solvent is also employed.

References Cited

UNITED STATES PATENTS

| 1,787,205 | 12/1930 | Loehr | 260—618H |
| 2,524,096 | 10/1950 | Wood | 260—618H |
| 2,561,984 | 7/1951 | Hillyer et al. | 260—618H |
| 2,822,403 | 2/1958 | Hopff et al. | 260—618H |

FOREIGN PATENTS

| 678,589 | 9/1952 | Great Britain | 260—618H |

OTHER REFERENCES

Newman et al.: JACS 71 (1949), 3362–3363.

BERNARD HELFIN, Primary Examiner

U.S. Cl. X.R.

252—522